United States Patent
Deshpande et al.

(10) Patent No.: US 10,089,207 B2
(45) Date of Patent: Oct. 2, 2018

(54) IDENTIFICATION OF SOFTWARE PHASES USING MACHINE LEARNING

(71) Applicant: Intel Corporation, Santa Clara, CA (US)

(72) Inventors: Shruthi A. Deshpande, Hillsboro, OR (US); Peng-Fei Chuang, Redwood City, CA (US); Kingsum Chow, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/317,485

(22) Filed: Jun. 27, 2014

(65) Prior Publication Data

US 2015/0378861 A1 Dec. 31, 2015

(51) Int. Cl.
*G06F 11/34* (2006.01)
*G06F 9/48* (2006.01)
(Continued)

(52) U.S. Cl.
CPC ........ *G06F 11/3409* (2013.01); *G06F 9/4881* (2013.01); *G06F 9/5005* (2013.01);
(Continued)

(58) Field of Classification Search
CPC ............................ G06F 11/34–11/3442; G06F 11/3466–11/3495; G06F 9/46–9/52;
(Continued)

(56) References Cited

U.S. PATENT DOCUMENTS 6,549,930 B1 * 4/2003 Chrysos ............... G06F 9/4881
718/104
6,691,067 B1 * 2/2004 Ding ................... G06F 11/3447
714/E11.197

(Continued)

OTHER PUBLICATIONS

IBM, "IBM Terminology Terms L" Retrieved from http://www-01.ibm.com/software/globalization/terminology/l.html on Oct. 1, 2015. p. 5.*

(Continued)

*Primary Examiner* — Emerson Puente
*Assistant Examiner* — Erika Kretzmer
(74) *Attorney, Agent, or Firm* — Barnes & Thornburg LLP (57) ABSTRACT

A computing device executes an application having a number of phases. The computing device collects performance data indicative of a number of performance attributes of the computing device during execution of the application. The performance attributes include page swap data, page fault data, and process queue data. The computing device merges data collected from a processor performance monitoring unit with data collected from an operating system of the computing device. The computing device partitions the performance data into a number of cluster models, applies a classification algorithm to each cluster model, and selects the cluster model with the lowest misclassification rate. The computing device associates each cluster of the cluster model to a phase of the software application. Compatible phases of software applications are scheduled based on the selected cluster model.

25 Claims, 4 Drawing Sheets

(51) Int. Cl.
  *G06F 9/50* (2006.01)
  *G06F 11/30* (2006.01)
  *G06F 11/36* (2006.01)

(52) U.S. Cl.
  CPC ........ *G06F 11/302* (2013.01); *G06F 11/3452* (2013.01); *G06F 11/3688* (2013.01); *G06F 2201/88* (2013.01)

(58) Field of Classification Search
  CPC .......................... G06F 11/302–11/3041; G06F 9/4881–9/4893; G06F 9/50–9/5094; G06F 2201/865; G06F 11/3452
  See application file for complete search history.

(56) References Cited

U.S. PATENT DOCUMENTS

| | | | | |
|---|---|---|---|---|
| 6,850,920 | B2* | 2/2005 | Vetter | G06F 11/3447 706/11 |
| 7,739,662 | B2* | 6/2010 | Bouguet | G06F 11/3404 714/38.13 |
| 8,255,185 | B2* | 8/2012 | Ozonat | G06F 11/3409 702/179 |
| 8,543,711 | B2* | 9/2013 | Rolia | G06F 9/505 709/229 |
| 8,954,996 | B2* | 2/2015 | Carvalho de Melo | G06F 11/3466 717/127 |
| 2002/0165838 | A1* | 11/2002 | Vetter | G06F 11/3447 706/20 |
| 2004/0111708 | A1 | 6/2004 | Calder et al. | |
| 2007/0157177 | A1* | 7/2007 | Bouguet | G06F 11/3404 717/128 |
| 2008/0271038 | A1* | 10/2008 | Rolia | G06F 9/505 718/105 |
| 2009/0165007 | A1* | 6/2009 | Aghajanyan | G06F 9/4881 718/103 |
| 2010/0094590 | A1* | 4/2010 | Ozonat | G06F 11/3452 702/179 |
| 2011/0145838 | A1* | 6/2011 | Carvalho de Melo | G06F 11/3466 719/318 |
| 2012/0143795 | A1 | 6/2012 | Han et al. | |
| 2013/0185672 | A1 | 7/2013 | Vasic et al. | |
| 2013/0185729 | A1* | 7/2013 | Vasic | G06F 9/5072 718/104 |

OTHER PUBLICATIONS

Davies, Bob, Jean-Yves Bouguet, Marzia Polito, and Murali M. Annavaram. "iPART : An Automated Phase Analysis and Recognition Tool". Technical report of Microprocessor Research Labs—Intel Corporation, Nov. 2003. pp. 1-12.*

Intel. "About Performance Analysis with VTune Amplifier" 2013. In Intel VTune Amplifier 2013.*

European Search Report for Application No. 15167664.0-1954, dated Nov. 16, 2015, 7 pages.

Office Action from CN201510368836.1 dated Jun. 28, 2017, 8 pages (in Chinese).

Office Action for Chinese Application No. 201510368836.1, dated Jun. 28, 2017, 8 pages.

Second Chinese Office Action dated Feb. 24, 2018 for Chinese Patent Application No. 201510368836.1, 8 pages.

* cited by examiner

IDENTIFICATION OF SOFTWARE PHASES USING MACHINE LEARNING

BACKGROUND

Software application performance monitoring and analysis allows application developers and system administrators to tune, optimize, and improve the performance of computing systems. Identifying particular phases of software applications is a useful technique for performance analysis. For example, after identifying software phases, applications may be grouped together to minimize resource conflicts between the applications. Software phases include any functional subunit of a software application such as a thread, object, function, module, or other component. Typical performance analysis tools may allow a human operator to identify software phases, for example by viewing graphs or tables of performance monitoring data. Other analysis tools may identify software phases by monitoring changes in the memory address of the instructions being executed (e.g., the value of a hardware program counter or instruction pointer). However, retrieving the instruction address may cause an unacceptable performance penalty. In addition, such a heavyweight performance monitoring approach may not be suitable for long-running applications such as server applications in a cloud environment

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
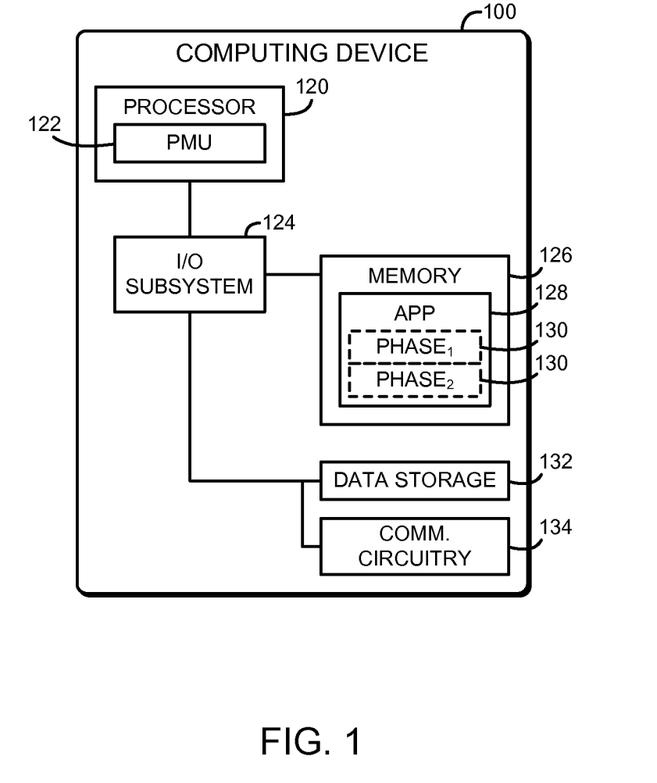
FIG. 1 is a simplified block diagram of at least one embodiment of a computing device for identifying software phases using machine learning.

Referring now to FIG. 1, an illustrative computing device 100 may be used for identifying software phases. The computing device 100 collects performance data during execution of one or more software applications. The computing device 100 may collect performance data using hardware performance counters, operating system monitoring tools, or any other performance monitoring system available to the computing device 100. The computing device 100 analyzes the performance data by grouping the data into clusters based on similarity across multiple dimensions of data and then using a classification algorithm to evaluate the quality of the clustering. The computing device 100 may group the performance data into several different cluster models and use the classification algorithm to select the best-matching cluster model. The computing device 100 associates the clusters of the performance data to phases of the software application. Using machine learning algorithms to identify software phases allows software phases to be identified without requiring any particular performance attribute to be specified prior to the analysis. Additionally, software phases may be identified based on observed behavior, which may expose phases that could not be predicted based on prior operator knowledge. Identifying the software phases may allow for scheduling applications for increased performance or better resource utilization, for example by scheduling software phases with different performance characteristics for execution on the same computing device 100.

The computing device 100 may be embodied as any type of device for performing the functions described herein. For example, the computing device 100 may be embodied as, without limitation, a server computer, a workstation, a desktop computer, a laptop computer, a notebook computer, a mobile computing device, a smart phone, a tablet computer, a cellular telephone, a handset, a messaging device, a wearable computing device, a vehicle telematics device, a distributed computing system, a multiprocessor system, a consumer electronic device, an embedded controller, and/or any other computing device configured to perform the functions described herein. As shown in FIG. 1, the illustrative computing device 100 includes a processor 120, an input/output subsystem 124, a memory 126, and a data storage device 132. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments (e.g. in implementations where the processor cache is used as random-access memory).

The processor 120 may be embodied as any type of processor capable of performing the functions described herein. For example, the processor 120 may be embodied as a single or multi-core processor(s), digital signal processor, microcontroller, or other processor or processing/controlling circuit. Although the illustrative computing device 100 includes a single processor 120, in some embodiments the computing device 100 may include more than one processor 120. For example, the computing device 100 may be embodied as a symmetric multiprocessing system with shared memory interconnects. The illustrative processor 120 includes a performance monitoring unit (PMU) 122. The PMU 122 may be embodied as a number of performance counters capable of recording and monitoring the flow of instructions through the processor 120. For example, the PMU 122 may be capable of reporting statistics on instructions retired, cache miss data, translation lookaside buffer (TLB) miss data, memory bandwidth usage, and other data. Although illustrated as a single PMU 122, in some embodiments the processor 120 may include several PMUs 122, for example one PMU 122 for each processor core.

The memory 126 may be embodied as any type of volatile or non-volatile memory or data storage capable of performing the functions described herein. In operation, the memory 126 may store various data and software used during operation of the computing device 100 such as operating systems, applications, programs, libraries, and drivers. The illustrative memory 126 includes an application 128 having a number of phases 130. The application 128 may represent a user application, system application, or other workload executed by the computing device 100. Each phase 130 of the application 128 represents a subdivision of the application 128 that performs a particular workload. For example, each phase 130 may be embodied as a code segment, module, subroutine, object, process, or other part of the application 128. In some embodiments, each phase 130 may be associated with a particular range of addresses within the memory 126. Of course, the memory 126 may include any number of applications 128 having their own phases 130.

The memory 126 is communicatively coupled to the processor 120 via the I/O subsystem 124, which may be embodied as circuitry and/or components to facilitate input/output operations with the processor 120, the memory 126, and other components of the computing device 100. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 100, on a single integrated circuit chip.

The data storage device 132 may be embodied as any type of device or devices configured for short-term or long-term storage of data such as, for example, memory devices and circuits, memory cards, hard disk drives, solid-state drives, or other data storage devices. The data storage device 132 may be used to store binary images of the application 128 as well as to store performance and event logs related to the application 128.

The computing device 100 further includes a communication circuit 134, which may be embodied as any communication circuit, device, or collection thereof, capable of enabling communications between the computing device 100 and remote computing devices. The communication circuit 134 may be configured to use any one or more communication technology (e.g., wireless or wired communications) and associated protocols (e.g., Ethernet, Bluetooth®, Wi-Fi®, WiMAX, HSPA+, LTE, etc.) to effect such communication. The communication circuit 134 may be embodied as a network adapter, including a wireless network adapter.

Although illustrated as a single device, the computing device 100 may be embodied as a single computing device or a collection of computers and associated devices. For example, in some embodiments, the computing device 100 may be embodied as a "virtual server" formed from multiple computing devices distributed across a network and operating in a public or private cloud. Accordingly, although the computing device 100 is illustrated in FIG. 1 as embodied as a single computing device, it should be appreciated that the computing device 100 may be embodied as multiple devices cooperating together to facilitate the functionality described below.

Figure 2:
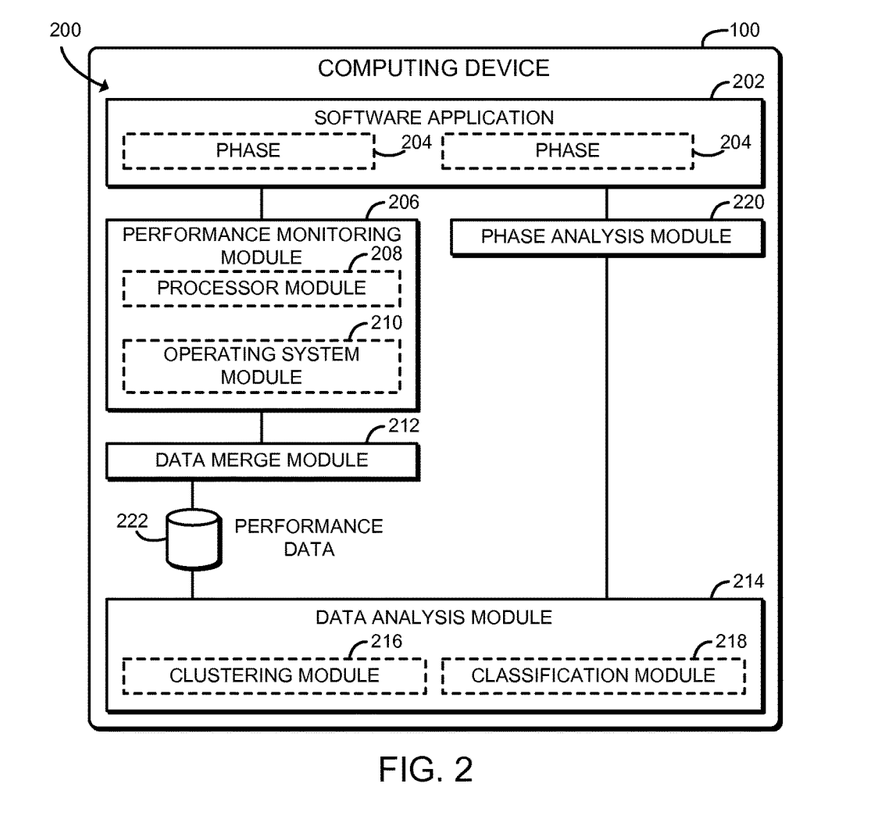
FIG. 2 is a simplified block diagram of at least one embodiment of an environment of the computing device of FIG. 1.

Referring now to FIG. 2, in the illustrative embodiment, the computing device 100 establishes an environment 200 during operation. The illustrative environment 200 includes a software application 202, a performance monitoring module 206, a data merge module 212, a data analysis module 214, and a phase analysis module 220. The various modules of the environment 200 may be embodied as hardware, firmware, software, or a combination thereof The software application 202 may be embodied as any application executed by the computing device 100, including but not limited to user applications, server applications, databases, or any other workload. The software application 202 may be embodied as a native application or as a managed application such as a Java® application. The software application 202 may include a number of phases 204. Each phase 204 may be embodied as any distinct functional component of the software application 202. For example, the phases 204 may include any combination of threads, processes, objects, functions, packages, or other functional subunits of the software application 202.

The performance monitoring module 206 is configured to monitor performance data of the computing device 100 collected during execution of the software application 202. The performance monitoring module 206 may monitor processor performance data, that is, data indicative of the flow of instructions through the processor 120 during execution of the application 202. The performance monitoring module 206 may use the PMU 122 of the processor 120 to collect the processor performance data. The performance monitoring module 206 may also monitor operating system performance data, that is, data indicative of the software performance of the computing device 100 during execution of the application 202. Both the processor performance data and the operating system performance data may be collected in real time during execution of the software application 202, or may be logged for future analysis. Those functions of the performance monitoring module 206 may be performed by sub-modules, for example by a processor module 208 or an operating system module 210.

The data merge module 212 is configured to merge the processor performance data and the operating system performance data to generate the combined performance data 222. The performance data 222 includes a number of data samples, with each data sample including a number of values corresponding to the various measured performance attributes of the computing device 100. The data merge module 212 may interpolate values for performance attributes for some data samples. Therefore, each data sample of the performance data 222 may include a measured or interpolated value for each performance attribute.

The data analysis module 214 is configured to group the performance data 222 according to one or more cluster models using an unsupervised clustering algorithm. Each cluster model includes a number of clusters, with each cluster associated with a number of data samples of the performance data 222 grouped based on similarity. The data analysis module 214 is also configured to analyze the cluster model using a classification algorithm to determine a misclassification rate for each cluster. The misclassification rate may be used to identify the cluster model that best matches the performance data 222. In some embodiments, the data analysis module 214 may pre-process the performance data 222 to prepare for cluster and/or classification analysis, for example by normalizing data or filtering out noise.

The phase analysis module 220 is configured to associate each cluster of the selected cluster model with a software phase 204 of the software application 202. The phase analysis module 220 may use any technique to associate data samples of the performance data 222 to the software phases 204. For example, the phase analysis module 220 may compare timestamps of the performance data 222 to timestamps of logged events of the software application 202.

Figure 3:
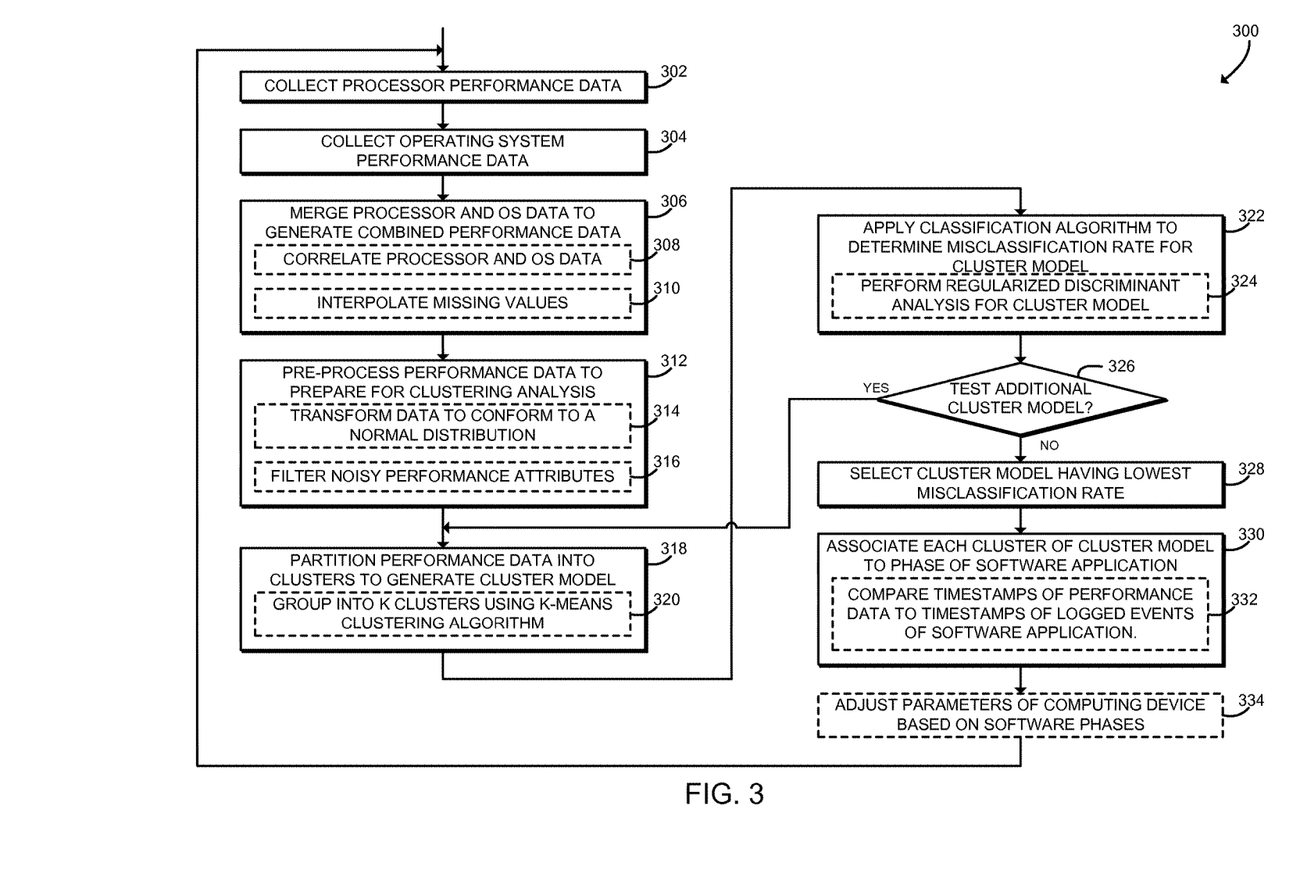
FIG. 3 is a simplified flow diagram of at least one embodiment of a method for identifying software phases that may be executed by the computing device of FIGS. 1 and 2.

Referring now to FIG. 3, in use, the computing device 100 may execute a method 300 for identifying software phases. The method 300 begins in block 302, in which the computing device 100 collects processor performance data from the performance monitoring unit(s) 122 during execution of a particular software application 202. The performance data 222 may be collected in real-time as the software application 202 is executed or may be logged for future analysis. The processor performance data includes data indicative of the flow of instructions through the processor 120 during execution of the application 202. For example, the processor performance data may include data on the number of instructions retired, cache miss data, translation lookaside buffer (TLB) miss data, memory bandwidth usage, and other data. The processor performance data may be organized as a collection data samples corresponding to samples taken at different times. Each data sample includes a number of different values corresponding to measured performance attributes of the computing device 100 (e.g., cache miss data, TLB miss data, etc.). For example, a data sample may include hundreds of values corresponding to associated performance attributes. The PMU 122 may be implemented in hardware or otherwise optimized to allow high-frequency sampling without degrading performance of the computing device 100. Therefore, the processor performance data may include a large volume of data samples recorded at a fine-grained sampling interval (e.g., one data sample for every tenth of a second).

In block 304 the computing device 100 collects operating system performance data from the operating system during execution of the software application 202. The operating system performance data may be collected by a performance-monitoring subsystem of the operating system such as the system activity reporter (SAR) on UNIX-like systems. Similar to processor performance data, the operating system performance data may be collected in real-time or logged for future collection. The operating system performance data includes data indicative of the software performance of the computing device 100 during execution of the application 202. For example, the operating system performance data may include page swap data, page fault data, process queue data, and other data. Similar to the processor performance data, the operating system performance data may be organized as a collection of data samples corresponding to samples taken at different times. Each data sample includes a number of different values corresponding to measured performance attributes of the computing device 100 (e.g., page swap data, process queue data, etc.). In contrast to the processor performance data, frequent sampling of the operating system performance data may degrade performance of the computing device 100. Therefore, the operating system performance data may be sampled at a relatively coarser sampling interval (e.g., one data sample for every several seconds).

In block 306, the computing device 100 merges the processor performance data and the operating system performance data to generate the combined performance data 222. The performance data 222 includes a collection of data samples corresponding to different times, with each data sample including a number of values corresponding to performance attributes of the computing device 100 (processor attributes and operating system attributes). The performance data 222 may be merged using any data processing technique. In some embodiments, the performance data 222 may include a large number of data samples; therefore, distributed data warehousing and other distributed processing techniques may be appropriate for merging the processor performance data. For example, the performance data 222 may be generated by joining two distributed data tables that include the processor performance data and the operating system performance data using a query language such HiveQL, provided by the Apache Hive package. In some embodiments, in block 308, the computing device 100 may correlate data samples in the processor performance data with the operating system performance data. For example, processor performance data may be correlated with operating system performance data based on timestamp. In some embodiments, in block 310 the computing device 100 may interpolate missing values in the performance data 222. Each data sample of the performance data 222 may not include values for every performance attribute measurable by the computing device 100. For example, because the operating system performance data may be sampled at a much lower rate than the processor performance data, operating system performance attributes may not be available for every data sample. As another example, certain performance attributes of the processor performance data may not be sampled at every sampling interval. The computing device 100 may interpolate the missing values by calculating values for performance attributes having no measured values based on the measured values of surrounding data samples. The computing device 100 may perform linear interpolation; that is, the computing device 100 may interpolate the missing values by calculating values using a linear function between the measured values. The computing device 100 may also use other interpolation methods.

Figure 4:
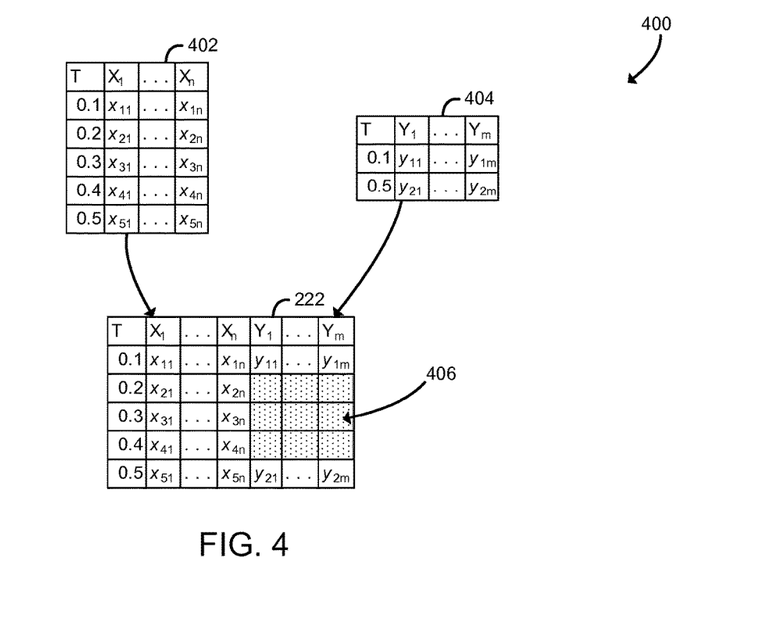
FIG. 4 is a simplified schematic diagram of performance data that may be collected by the computing device of FIGS. 1 and 2.

For example, referring now to FIG. 4, a schematic diagram 400 illustrates the collection and interpolation of the performance data 222. The table 402 illustrates processor performance data collected by the computing device 100. Each row of the table 402 corresponds to a single data sample. Column T represents the timestamp for each data sample; in the illustrative example, the sampling interval is 0.1 seconds. The columns $X_1$ through $X_n$ represent the performance attributes measured for each data sample (e.g., cache misses, memory bandwidth used, etc.). The variables $x_{11}$ through $x_{5n}$ represent individual values of the performance parameters for each data sample. The table 404 illustrates operating system performance data collected by the computing device 100. Each row of the table 404 corresponds to a single data sample. Column T similarly represents the timestamp for each data sample; note that in the illustrative example the sampling interval is 0.4 seconds, larger than for the processor performance data. The columns $Y_1$ through $Y_m$ represent the performance attributes measured for each data sample (e.g., page faults, process queues, etc.). The variables $y_{11}$ through $y_{2m}$ represent individual values of the performance parameters for each data sample.

As shown, the tables 402, 404 are joined to form the combined performance data 222. For timestamps having data in both tables 402, 404, the performance data are merged into a single row. For example, the data sample for timestamp 0.1 includes the values $x_{11}$ through $x_{1n}$ joined with the values $y_{11}$ through $y_{1m}$. The shaded cells 406 represent missing values in the performance data. That is, the shaded cells 406 correspond to rows for timestamps that do not have data for every performance parameter. In the illustrative example, the shaded cells 406 include performance attributes only from the table 402. As described above, in some embodiments the computing device 100 may interpolate values for the missing values in the cells 406. For example, the computing device 100 may calculate values for the parameter $Y_1$ for timestamps 0.2 through 0.4 by linearly interpolating values for y between the values of $y_{11}$ and $y_{21}$. Similar calculations may be performed for the other cells 406.

Referring back to FIG. 3, after merging the performance data 222, in block 312 the computing device 100 pre-processes the performance data 222 to prepare for clustering analysis. The computing device 100 may perform any data quality processing that improves the accuracy of clustering. The particular pre-processing performed may depend on the clustering algorithm selected, as described below. In some embodiments, in block 314 the computing device 100 may transform one or more performance attributes of the performance data 222 to conform to a normal distribution. Transforming the performance data 222 may account for scale differences among the different performance attributes. Additionally, further analysis algorithms such as discriminant analysis may assume that data is normally distributed. In some embodiments, in block 316 the computing device 100 may filter out one or more performance attributes that are determined to be noise. Noisy performance attributes include attributes that do not change in response to execution of different software phases 204 of the software application 202. Thus, they may not contribute to successfully clustering the performance data 222. In some embodiments, the computing device 100 may identify noisy performance attributes as those having low variance. In particular, the computing device 100 may identify performance attributes whose values have a ratio of variance to mean that is less than a predefined threshold ratio. The computing device 100 may filter noisy performance attributes by setting their values to zero or otherwise disregarding them in any further analysis.

In block 318, the computing device 100 partitions the performance data 222 into a number of clusters based on similarity between the data samples. The computing device 100 assigns each data sample of the performance data 222 to a cluster label. The assignment of data samples to cluster labels may be called a cluster model. The computing device 100 may partition the performance data 222 into any number of clusters. The number of clusters may be predefined or specified at runtime by a user of the computing device 100. For example, the user may have domain knowledge regarding the probable number of software phases 204 of the software application 202, and specify a cluster number corresponding to the probable number of software phases 204. As a concrete example, given that the software application 202 is a Java application, the user may specify a number of clusters corresponding to a garbage collection thread and the number of worker threads used in the application 202. The computing device 100 may use any unsupervised clustering algorithm to partition the performance data 222. That is, the computing device 100 may use any clustering algorithm that does not require the user to specify example cluster labels or otherwise require a training data set. In some embodiments, in block 320 the computing device 100 may group the performance data 222 into K clusters using the K-means clustering algorithm. The K-means clustering algorithm is an unsupervised algorithm that groups data samples that are close together in multidimensional space into clusters. As described above, the value for K may be predefined or specified by the user.

Figure 5:
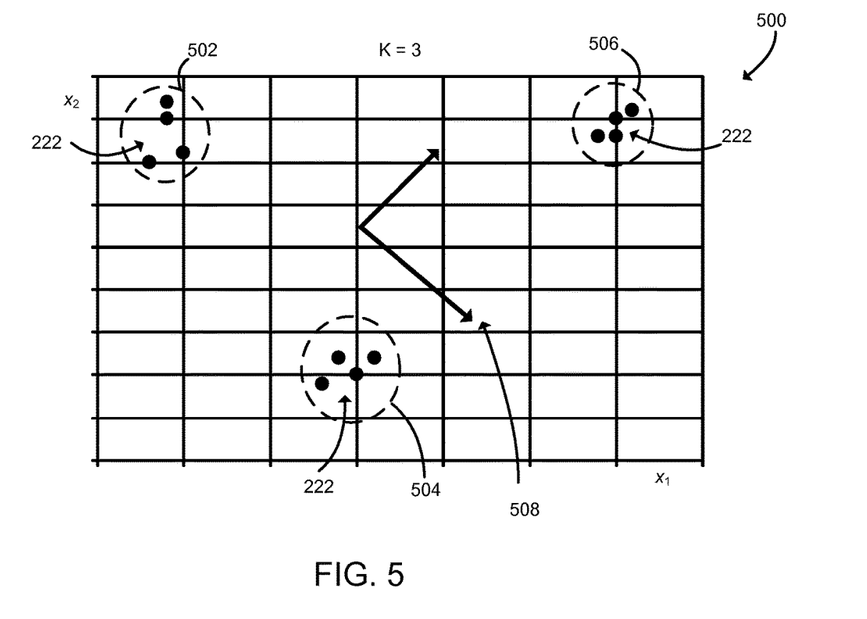
FIG. 5 is a simplified plot of performance data and data clusters that may be processed by the computing device of FIGS. 1 and 2.

For example, referring now to FIG. 5, the plot 500 illustrates the results of clustering the performance data 222. The plot 500 includes two axes $x_1$ and $x_2$ corresponding to performance attributes of the performance data 222. The data samples of the illustrative performance data 222 are plotted as points in two-dimensional space defined by the parameters $x_1$ and $x_2$. As illustrated in the plot 500, the performance data 222 has been partitioned into three clusters 502, 504, 506, shown by dashed boundaries. In the illustrative example, the performance data 222 has been partitioned by applying K-means clustering when K equals three. As shown, each of the data samples within a particular cluster 502, 504, 506 is close to the other data samples of the cluster 502, 505, 506 in two-dimensional space. Of course, in use the performance data 222 may have many more dimensions, for example, hundreds of dimensions. Accordingly, in use the performance data 222 is partitioned into clusters in multi-dimensional space.

Referring back to FIG. 3, after generating the cluster model, in block 322 the computing device 100 applies a classification algorithm to determine a misclassification rate for each cluster in the cluster model. The classification algorithm develops functions that may be used to predict to which group each data sample belongs. The classification algorithm may use the cluster labels assigned to the performance data 222 as training data. In other words, the classification algorithm may be a supervised algorithm. Thus, applying the classification algorithm to a particular data sample may predict that the data sample should be classified in a cluster different from the cluster assigned by the clustering algorithm. The computing device 100 may identify all such misclassified data samples and determine a misclassification rate for each cluster. In other words, the classification algorithm reports the number of misclassified data samples for the cluster model. Lower misclassification rates may indicate that the cluster model is a good fit for the performance data 222. The computing device 100 may apply any classification algorithm suitable for discriminating data samples between clusters. In some embodiments, in block 324 the computing device 100 may perform regularized discriminant analysis on the cluster model. Linear discriminant analysis develops discriminant functions that are linear combinations of the performance attributes that best discriminate among clusters. Regularized discriminant analysis is similar but additionally regularizes the data, which may improve performance for relatively small sample sizes. Regularized discriminant analysis returns a confusion matrix that reports misclassified data samples.

Referring again to FIG. 5, the plot 500 illustrates application of a classification algorithm. The vectors 508 represent two linear discriminant functions generated by regularized discriminant analysis. Visually, the performance data 222 is classified by projecting each data sample onto the vectors 508. The projected data samples are separated into groups based on their position in the subspace defined by the vectors 508. A data sample is misclassified if its projection is on the wrong side of the vectors 508 (in multi-dimensional space). The illustrative plot 500 includes two vectors 508 corresponding to two discriminant functions; of course, in use, the number of discriminant functions may depend on the number of clusters within the cluster model.

Referring back to FIG. 3, after applying classification analysis, in block 326 the computing device 100 determines whether to test an additional cluster model. As described above, the user may specify the number of clusters for cluster analysis. In some embodiments, the user may specify several potential numbers of clusters or a range of numbers of clusters to test. Additionally or alternatively, the computing device 100 may search over a predefined range of numbers of clusters. If additional cluster models should be tested, the method 300 loops back to block 318 to partition the performance data 222 into the new number of clusters. If no additional cluster models should be tested, the method 300 advances to block 328.

In block 328, the computing device 100 selects the cluster model having the lowest misclassification rate, as determined by classification analysis in block 322, described above. In other words, the computing device 100 determines the number of clusters for which the classification algorithm determines the fewest data samples are in the wrong cluster. Of course, in embodiments testing only a single cluster model (and therefore a single number of clusters), that cluster model may be selected.

In block 330, the computing device 100 associates each cluster of the cluster model to a particular software phase 204 of the software application 202. By associating software phases 204 to clusters in the performance data 222, the computing device 100 may identify components of the software application 202 that exhibit similar behavior across several performance parameters. The computing device 100 may use any method to associate the clusters to the software phases 204. In block 332, in some embodiments the computing device 100 may compare timestamps of the performance data 222 to timestamps of logged events of the software application 202. For example, the computing device 100 may determine that the data samples in a cluster correspond to times when the software application 202 is servicing user requests and that data samples in another cluster correspond to times when the software application 202 is performing garbage collection.

After associating the software phases 204 to the clusters identified in the performance data 222, in some embodiments in block 334 the computing device 100 may adjust one or more parameters of the computing device 100 based on the identified software phases 204. For example, performance attributes of the computing device 100 may be tuned based on the software phases 204 executed during a typical run of the application 202. For example, certain software phases 204 may primarily use particular computing resources (e.g., processor resources, storage I/O resources, network resources, etc.), and the computing device 100 may be configured for enhanced performance of those resources. Additionally or alternatively, the computing device 100 may identify software phases 204 for several different applications 202. As described above, that information may be used to determine compatible phases 204 of different software applications 202, that is, phases 204 of software applications 202 that do not contend for the same resources. Such information may be used to schedule the software applications 202 more efficiently, either on the computing device 100 individually or across a cluster of computing devices. For example, software applications 202 may be scheduled for simultaneous execution on the same computing device 100 if the phases 204 of the software applications 202 use different computing resources (e.g., one phase 204 exhibits high processor usage and another phase 204 exhibits high storage I/O usage). As another example, two or more phases 204 that all exhibit high processor usage may be scheduled for execution on different computing devices 100. After adjusting parameters of the computing device 100 in some embodiments, the method 300 loops back to block 302 to further identify software phases 204.

EXAMPLES

Illustrative examples of the technologies disclosed herein are provided below. An embodiment of the technologies may include any one or more, and any combination of, the examples described below.

Example 1 includes a computing device for software application performance analysis, the computing device comprising a performance monitoring module to collect performance data indicative of a plurality of performance attributes of the computing device during execution of a software application, wherein the performance data includes a plurality of data samples, each data sample including a plurality of values corresponding to the performance attributes; a data analysis module to partition the performance data into a plurality of clusters using an unsupervised clustering algorithm, wherein each cluster includes a number of data samples of the performance data; and a phase analysis module to associate each cluster of the plurality of clusters to a phase of the software application.

Example 2 includes the subject matter of Example 1, and wherein to partition the performance data comprises to: (i) partition the performance data into a first cluster model having a first number of clusters and (ii) partition the performance data into a second cluster model having a second number of clusters, the second number of clusters different from the first number of clusters; the data analysis module is further to: (i) apply a classification algorithm to determine a first misclassification rate for each cluster of the first cluster model, (ii) apply the classification algorithm to determine a second misclassification rate for each cluster of the second cluster model, and (iii) select a cluster model having the lower misclassification rate from the first cluster model and the second cluster model; and wherein to associate each cluster of the plurality of clusters comprises to associate each cluster of the cluster model having the lower misclassification rate to a phase of the software application.

Example 3 includes the subject matter of any of Examples 1 and 2, and wherein to collect the performance data comprises to collect processor performance data from a performance monitoring unit (PMU) of the computing device.

Example 4 includes the subject matter of any of Examples 1-3, and wherein the processor performance data comprises at least one of cache miss data, translation lookaside buffer miss data, or memory bandwidth usage data.

Example 5 includes the subject matter of any of Examples 1-4, and wherein to collect the performance data comprises to collect operating system performance data from an operating system of the computing device.

Example 6 includes the subject matter of any of Examples 1-5, and wherein the operating system performance data comprises at least one of page swap data, page fault data, or process queue data.

Example 7 includes the subject matter of any of Examples 1-6, and wherein to collect the performance data comprises to collect processor performance data from a performance monitoring unit (PMU) of the computing device; collect operating system performance data from an operating system of the computing device; and the computing device further comprises a data merge module to merge the processor performance data and the operating system performance data to generate the performance data.

Example 8 includes the subject matter of any of Examples 1-7, and wherein to merge the processor performance data and the operating system performance data comprises to interpolate missing values in the operating system performance data.

Example 9 includes the subject matter of any of Examples 1-8, and wherein the data analysis module is further to pre-process the performance data to prepare the performance data for partitioning using the unsupervised clustering algorithm.

Example 10 includes the subject matter of any of Examples 1-9, and wherein to pre-process the performance data comprises to transform the values corresponding to a performance attribute of the plurality of performance attributes to conform to a predefined distribution.

Example 11 includes the subject matter of any of Examples 1-10, and wherein to pre-process the performance data comprises to disregard a performance attribute of the plurality of attributes having a ratio of variance to mean less than a threshold ratio of variance to mean.

Example 12 includes the subject matter of any of Examples 1-11, and wherein to partition the performance data comprises to partition the performance data into a number of clusters specified by a user of the computing device.

Example 13 includes the subject matter of any of Examples 1-12, and wherein the unsupervised clustering algorithm comprises a K-means clustering algorithm.

Example 14 includes the subject matter of any of Examples 1-13, and wherein the classification algorithm comprises a regularized discriminant analysis algorithm.

Example 15 includes the subject matter of any of Examples 1-14, and wherein to associate each cluster of the plurality of clusters comprises to compare timestamps of the data samples of the performance data to timestamps of logged events of the software application.

Example 16 includes a method for software application performance analysis, the method comprising collecting, by a computing device, performance data indicative of a plurality of performance attributes of the computing device during execution of a software application, wherein the performance data includes a plurality of data samples, each data sample including a plurality of values corresponding to the performance attributes; partitioning, by the computing device, the performance data into a plurality of clusters using an unsupervised clustering algorithm, wherein each cluster includes a number of data samples of the performance data; and associating, by the computing device, each cluster of the plurality of clusters to a phase of the software application.

Example 17 includes the subject matter of Example 16, and wherein partitioning the performance data comprises (i) partitioning the performance data into a first cluster model having a first number of clusters and (ii) partitioning the performance data into a second cluster model having a second number of clusters, the second number of clusters different from the first number of clusters; the method further comprising: applying, by the computing device, a classification algorithm to determine a first misclassification rate for each cluster of the first cluster model; applying, by the computing device, the classification algorithm to determine a second misclassification rate for each cluster of the second cluster model; selecting, by the computing device, a cluster model having the lower misclassification rate from the first cluster model and the second cluster model; and wherein associating each cluster of the plurality of clusters comprises associating each cluster of the cluster model having the lower misclassification rate to a phase of the software application.

Example 18 includes the subject matter of any of Examples 16 and 17, and wherein collecting the performance data comprises collecting processor performance data from a performance monitoring unit (PMU) of the computing device.

Example 19 includes the subject matter of any of Examples 16-18, and wherein collecting the processor performance data comprises collecting at least one of cache miss data, translation lookaside buffer miss data, or memory bandwidth usage data.

Example 20 includes the subject matter of any of Examples 16-19, and wherein collecting the performance data comprises collecting operating system performance data from an operating system of the computing device.

Example 21 includes the subject matter of any of Examples 16-20, and wherein collecting the operating system performance data comprises collecting at least one of page swap data, page fault data, or process queue data.

Example 22 includes the subject matter of any of Examples 16-21, and wherein collecting the performance data comprises collecting processor performance data from a performance monitoring unit (PMU) of the computing device; collecting operating system performance data from an operating system of the computing device; and merging the processor performance data and the operating system performance data to generate the performance data.

Example 23 includes the subject matter of any of Examples 16-22, and wherein merging the processor performance data and the operating system performance data comprises interpolating missing values in the operating system performance data.

Example 24 includes the subject matter of any of Examples 16-23, and further including pre-processing, by the computing device, the performance data to prepare the performance data for partitioning using the unsupervised clustering algorithm.

Example 25 includes the subject matter of any of Examples 16-24, and wherein pre-processing the performance data comprises transforming the values corresponding to a performance attribute of the plurality of performance attributes to conform to a specified distribution.

Example 26 includes the subject matter of any of Examples 16-25, and wherein pre-processing the performance data comprises disregarding a performance attribute of the plurality of attributes having a ratio of variance to mean less than a threshold ratio of variance to mean.

Example 27 includes the subject matter of any of Examples 16-26, and wherein partitioning the performance data comprises partitioning the performance data into a number of clusters specified by a user of the computing device.

Example 28 includes the subject matter of any of Examples 16-27, and wherein partitioning the performance data comprises partitioning the performance data into a number of clusters using a K-means clustering algorithm.

Example 29 includes the subject matter of any of Examples 16-28, and wherein applying the classification algorithm comprises applying a regularized discriminant analysis algorithm to determine a misclassification rate for each cluster of the plurality of clusters.

Example 30 includes the subject matter of any of Examples 16-29, and wherein associating each cluster of the plurality of clusters comprises comparing timestamps of the data samples of the performance data to timestamps of logged events of the software application.

Example 31 includes a computing device comprising a processor; and a memory having stored therein a plurality of instructions that when executed by the processor cause the computing device to perform the method of any of Examples 16-30.

Example 32 includes one or more machine readable storage media comprising a plurality of instructions stored thereon that in response to being executed result in a computing device performing the method of any of Examples 16-30.

Example 33 includes a computing device comprising means for performing the method of any of Examples 16-30.

Example 34 includes a computing device for software application performance analysis, the computing device comprising means for collecting performance data indicative of a plurality of performance attributes of the computing device during execution of a software application, wherein the performance data includes a plurality of data samples, each data sample including a plurality of values corresponding to the performance attributes; means for partitioning the performance data into a plurality of clusters using an unsupervised clustering algorithm, wherein each cluster includes a number of data samples of the performance data; and means for associating each cluster of the plurality of clusters to a phase of the software application.

Example 35 includes the subject matter of Example 34, and wherein the means for partitioning the performance data comprises (i) means for partitioning the performance data into a first cluster model having a first number of clusters and (ii) means for partitioning the performance data into a second cluster model having a second number of clusters, the second number of clusters different from the first number of clusters; the computing device further including means for applying a classification algorithm to determine a first misclassification rate for each cluster of the first cluster model; means for applying the classification algorithm to determine a second misclassification rate for each cluster of the second cluster model; means for selecting a cluster model having the lower misclassification rate from the first cluster model and the second cluster model; and wherein the means for associating each cluster of the plurality of clusters comprises means for associating each cluster of the cluster model having the lower misclassification rate to a phase of the software application.

Example 36 includes the subject matter of any of Examples 34 and 35, and wherein the means for collecting the performance data comprises means for collecting processor performance data from a performance monitoring unit (PMU) of the computing device.

Example 37 includes the subject matter of any of Examples 34-36, and wherein the means for collecting the processor performance data comprises means for collecting at least one of cache miss data, translation lookaside buffer miss data, or memory bandwidth usage data.

Example 38 includes the subject matter of any of Examples 34-37, and wherein the means for collecting the performance data comprises means for collecting operating system performance data from an operating system of the computing device.

Example 39 includes the subject matter of any of Examples 34-38, and wherein the means for collecting the operating system performance data comprises means for collecting at least one of page swap data, page fault data, or process queue data.

Example 40 includes the subject matter of any of Examples 34-39, and wherein the means for collecting the performance data comprises means for collecting processor performance data from a performance monitoring unit (PMU) of the computing device; means for collecting operating system performance data from an operating system of the computing device; and means for merging the processor performance data and the operating system performance data to generate the performance data.

Example 41 includes the subject matter of any of Examples 34-40, and wherein the means for merging the processor performance data and the operating system performance data comprises means for interpolating missing values in the operating system performance data.

Example 42 includes the subject matter of any of Examples 34-41, and further including means for pre-processing the performance data to prepare the performance data for partitioning using the unsupervised clustering algorithm.

Example 43 includes the subject matter of any of Examples 34-42, and wherein the means for pre-processing the performance data comprises means for transforming the values corresponding to a performance attribute of the plurality of performance attributes to conform to a specified distribution.

Example 44 includes the subject matter of any of Examples 34-43, and wherein the means for pre-processing the performance data comprises means for disregarding a performance attribute of the plurality of attributes having a ratio of variance to mean less than a threshold ratio of variance to mean.

Example 45 includes the subject matter of any of Examples 34-44, and wherein the means for partitioning the performance data comprises means for partitioning the performance data into a number of clusters specified by a user of the computing device.

Example 46 includes the subject matter of any of Examples 34-45, and wherein the means for partitioning the performance data comprises means for partitioning the performance data into a number of clusters using a K-means clustering algorithm.

Example 47 includes the subject matter of any of Examples 34-46, and wherein the means for applying the classification algorithm comprises means for applying a regularized discriminant analysis algorithm to determine a misclassification rate for each cluster of the plurality of clusters.

Example 48 includes the subject matter of any of Examples 34-47, and wherein the means for associating each cluster of the plurality of clusters comprises means for comparing timestamps of the data samples of the performance data to timestamps of logged events of the software application.

The invention claimed is:

1. A hardware computing device for software application performance analysis, the computing device comprising:
one or more physical processors to implement:
a performance monitoring module to collect performance data indicative of a plurality of performance attributes of the computing device during execution of a first software application and of a second software application, wherein the performance data includes a plurality of data samples, each data sample including a plurality of values corresponding to the performance attributes, and the performance attributes include page swap data, page fault data, and process queue data;
a data analysis module to partition the performance data into a plurality of clusters using an unsupervised clustering algorithm based on a plurality of cluster models, and apply a classification algorithm to clusters generated by each cluster model to determine which of the plurality of cluster models resulted in a lowest misclassification rate, wherein each cluster includes a number of data samples of the performance data; and
a phase analysis module to correlate a first set of timestamps of logged events of the first software application with a second set of timestamps of the performance data of the first software application and a third set of timestamps of logged events of the second software application with a fourth set of timestamps of the performance data of the second software application, and to associate each cluster of the plurality of clusters to a phase of the corresponding software application;
wherein the one or more physical processors are further to schedule compatible phases of the first software application and of the second software application, to be executed concurrently by the hardware computing device, wherein the compatible phases of the software applications do not contend for the same resources, and to determine whether a first phase of the first software application associated with one of the clusters uses a first type of resource more than a second type of resource and adjust, in response to a determination that the first phase of the first software application uses the first type of resource more than the second type of resource, a parameter to cause the first type of resource to provide enhanced performance during the first phase to improve an efficiency of execution of both software applications.

2. The hardware computing device of claim 1, wherein:
to partition the performance data comprises to: (i) partition the performance data into a first cluster model having a first number of clusters and (ii) partition the performance data into a second cluster model having a second number of clusters, the second number of clusters different from the first number of clusters;
the data analysis module is further to: (i) apply the classification algorithm to determine a first misclassification rate for each cluster of the first cluster model, (ii) apply the classification algorithm to determine a second misclassification rate for each cluster of the second cluster model, and (iii) select a cluster model having the lower misclassification rate from the first cluster model and the second cluster model; and
wherein to associate each cluster of the plurality of clusters comprises to associate each cluster of the cluster model having the lower misclassification rate to a phase of the software application.

3. The hardware computing device of claim 1, wherein to collect the performance data comprises to collect processor performance data from a performance monitoring unit (PMU) of the computing device.

4. The hardware computing device of claim 1, wherein to collect the performance data comprises to collect operating system performance data from an operating system of the computing device.

5. The hardware computing device of claim 1, wherein to collect the performance data comprises to:
collect processor performance data from a performance monitoring unit (PMU) of the computing device;
collect operating system performance data from an operating system of the computing device; and
the computing device further comprises a data merge module to merge the processor performance data and the operating system performance data to generate the performance data.

6. The hardware computing device of claim 5, wherein to merge the processor performance data and the operating system performance data comprises to interpolate missing values in the operating system performance data.

7. The hardware computing device of claim 5, wherein to collect the processor performance data comprises to collect the processor performance data at a first sampling rate and to collect the operating system performance data comprises to collect the operating system performance data at a second sampling rate that is less than the first sampling rate.

8. The hardware computing device of claim 1, wherein the data analysis module is further to pre-process the performance data to prepare the performance data for partitioning using the unsupervised clustering algorithm, wherein to pre-process the performance data comprises to transform the values corresponding to a performance attribute of the plurality of performance attributes to conform to a predefined distribution.

9. The hardware computing device of claim 1, wherein the data analysis module is further to pre-process the performance data to prepare the performance data for partitioning using the unsupervised clustering algorithm, wherein to pre-process the performance data comprises to disregard a performance attribute of the plurality of attributes having a ratio of variance to mean less than a threshold ratio of variance to mean.

10. The hardware computing device of claim 1, wherein to partition the performance data comprises to partition the performance data into a number of clusters specified by a user of the computing device.

11. The hardware computing device of claim 1, wherein the unsupervised clustering algorithm comprises a K-means clustering algorithm.

12. A method for software application performance analysis, the method comprising:
collecting, by a computing device, performance data indicative of a plurality of performance attributes of the computing device during execution of a first software application and of a second software application, wherein the performance data includes a plurality of data samples, each data sample including a plurality of values corresponding to the performance attributes, and the performance attributes include page swap data, page fault data, and process queue data;
partitioning, by the computing device, the performance data into a plurality of clusters using an unsupervised clustering algorithm based on a plurality of cluster models;
applying a classification algorithm to clusters generated by each cluster model to determine which of the plurality of cluster models resulted in a lowest misclassification rate, wherein each cluster includes a number of data samples of the performance data;
associating, by the computing device, each cluster of the plurality of clusters to a phase of the corresponding software application by correlating a first set of timestamps of logged events of the first software application with a second set of timestamps of the performance data of the first software application and a third set of timestamps of logged events of the second software application with a fourth set of timestamps of the performance data of the second software application;
scheduling compatible phases of the first software application and of the second software application, to be executed concurrently by the computing device, wherein the compatible phases of the software applications do not contend for the same resources;
determining, by the computing device, whether a first phase of the first software application associated with one of the clusters uses a first type of resource more than a second type of resource; and
adjusting, by the computing device and in response to a determination that the first phase of the first software application associated with one of the clusters uses a first type of resource more than a second type of resource, a parameter to cause the first type of resource to provide enhanced performance during the first phase to improve an efficiency of execution of both software applications.

13. The method of claim 12, wherein:
partitioning the performance data comprises (i) partitioning the performance data into a first cluster model having a first number of clusters and (ii) partitioning the performance data into a second cluster model having a second number of clusters, the second number of clusters different from the first number of clusters; the method further comprising:
applying, by the computing device, the classification algorithm to determine a first misclassification rate for each cluster of the first cluster model;
applying, by the computing device, the classification algorithm to determine a second misclassification rate for each cluster of the second cluster model;
selecting, by the computing device, a cluster model having the lower misclassification rate from the first cluster model and the second cluster model; and
wherein associating each cluster of the plurality of clusters comprises associating each cluster of the cluster model having the lower misclassification rate to a phase of the software application.

14. The method of claim 12, wherein collecting the performance data comprises:
collecting processor performance data from a performance monitoring unit (PMU) of the computing device;
collecting operating system performance data from an operating system of the computing device; and
merging the processor performance data and the operating system performance data to generate the performance data.

15. The method of claim 14, wherein merging the processor performance data and the operating system performance data comprises interpolating missing values in the operating system performance data.

16. The method of claim 12, further comprising pre-processing, by the computing device, the performance data to prepare the performance data for partitioning using the unsupervised clustering algorithm, wherein pre-processing the performance data comprises transforming the values corresponding to a performance attribute of the plurality of performance attributes to conform to a specified distribution.

17. The method of claim 12, further comprising pre-processing, by the computing device, the performance data to prepare the performance data for partitioning using the unsupervised clustering algorithm, wherein pre-processing the performance data comprises disregarding a performance attribute of the plurality of attributes having a ratio of variance to mean less than a threshold ratio of variance to mean.

18. One or more non-transitory computer-readable storage media comprising a plurality of instructions that in response to being executed cause a computing device to:
collect performance data indicative of a plurality of performance attributes of the computing device during execution of a first software application and of a second software application, wherein the performance data includes a plurality of data samples, each data sample including a plurality of values corresponding to the performance attributes, and the performance attributes include page swap data, page fault data, and process queue data;
partition the performance data into a plurality of clusters using an unsupervised clustering algorithm based on a plurality of cluster models;
apply a classification algorithm to clusters generated by each cluster model to determine which of the plurality of cluster models resulted in a lowest misclassification rate, wherein each cluster includes a number of data samples of the performance data;
correlate a first set of timestamps of logged events of the first software application with a second set of timestamps of the performance data of the first software application and a third set of timestamps of logged events of the second software application with a fourth set of timestamps of the performance data of the second software application to associate each cluster of the plurality of clusters to a phase of the corresponding software application;
schedule compatible phases of the first software application and of the second software application, to be executed concurrently by the computing device, wherein the compatible phases of the software applications do not contend for the same resources;

determine whether a first phase of the first software application uses a first type of resource more than a second type of resource; and adjust, in response to a determination that the first phase of the first software application uses the first type of resource more than the second type of resource, a parameter to cause the first type of resource to provide enhanced performance during the first phase to improve an efficiency of execution of both software applications.

19. The one or more non-transitory computer-readable storage media of claim 18, wherein:

to partition the performance data comprises to (i) partition the performance data into a first cluster model having a first number of clusters and (ii) partition the performance data into a second cluster model having a second number of clusters, the second number of clusters different from the first number of clusters; the one or more computer-readable storage media further comprising a plurality of instructions that in response to being executed cause the computing device to:

apply the classification algorithm to determine a first misclassification rate for each cluster of the first cluster model;

apply the classification algorithm to determine a second misclassification rate for each cluster of the second cluster model;

select a cluster model having the lower misclassification rate from the first cluster model and the second cluster model; and wherein to associate each cluster of the plurality of clusters comprises to associate each cluster of the cluster model having the lower misclassification rate to a phase of the software application.

20. The one or more non-transitory computer-readable storage media of claim 18, wherein to collect the performance data comprises to collect processor performance data from a performance monitoring unit (PMU) of the computing device.

21. The one or more non-transitory computer-readable storage media of claim 18, wherein to collect the performance data comprises to collect operating system performance data from an operating system of the computing device.

22. The one or more non-transitory computer-readable storage media of claim 18, wherein to collect the performance data comprises to:

collect processor performance data from a performance monitoring unit (PMU) of the computing device;

collect operating system performance data from an operating system of the computing device; and merge the processor performance data and the operating system performance data to generate the performance data.

23. The one or more non-transitory computer-readable storage media of claim 22, wherein to merge the processor performance data and the operating system performance data comprises to interpolate missing values in the operating system performance data.

24. The one or more non-transitory computer-readable storage media of claim 18, further comprising a plurality of instructions that in response to being executed cause the computing device to pre-process the performance data to prepare the performance data for partitioning using the unsupervised clustering algorithm, wherein to pre-process the performance data comprises to transform the values corresponding to a performance attribute of the plurality of performance attributes to conform to a specified distribution.

25. The one or more non-transitory computer-readable storage media of claim 18, further comprising a plurality of instructions that in response to being executed cause the computing device to pre-process the performance data to prepare the performance data for partitioning using the unsupervised clustering algorithm, wherein to pre-process the performance data comprises to disregard a performance attribute of the plurality of attributes having a ratio of variance to mean less than a threshold ratio of variance to mean.

* * * * *